Aug. 7, 1945.   C. B. SCHMIDT   2,381,228
FOCUSING ATTACHMENT FOR CAMERAS
Filed Nov. 18, 1942   2 Sheets-Sheet 1
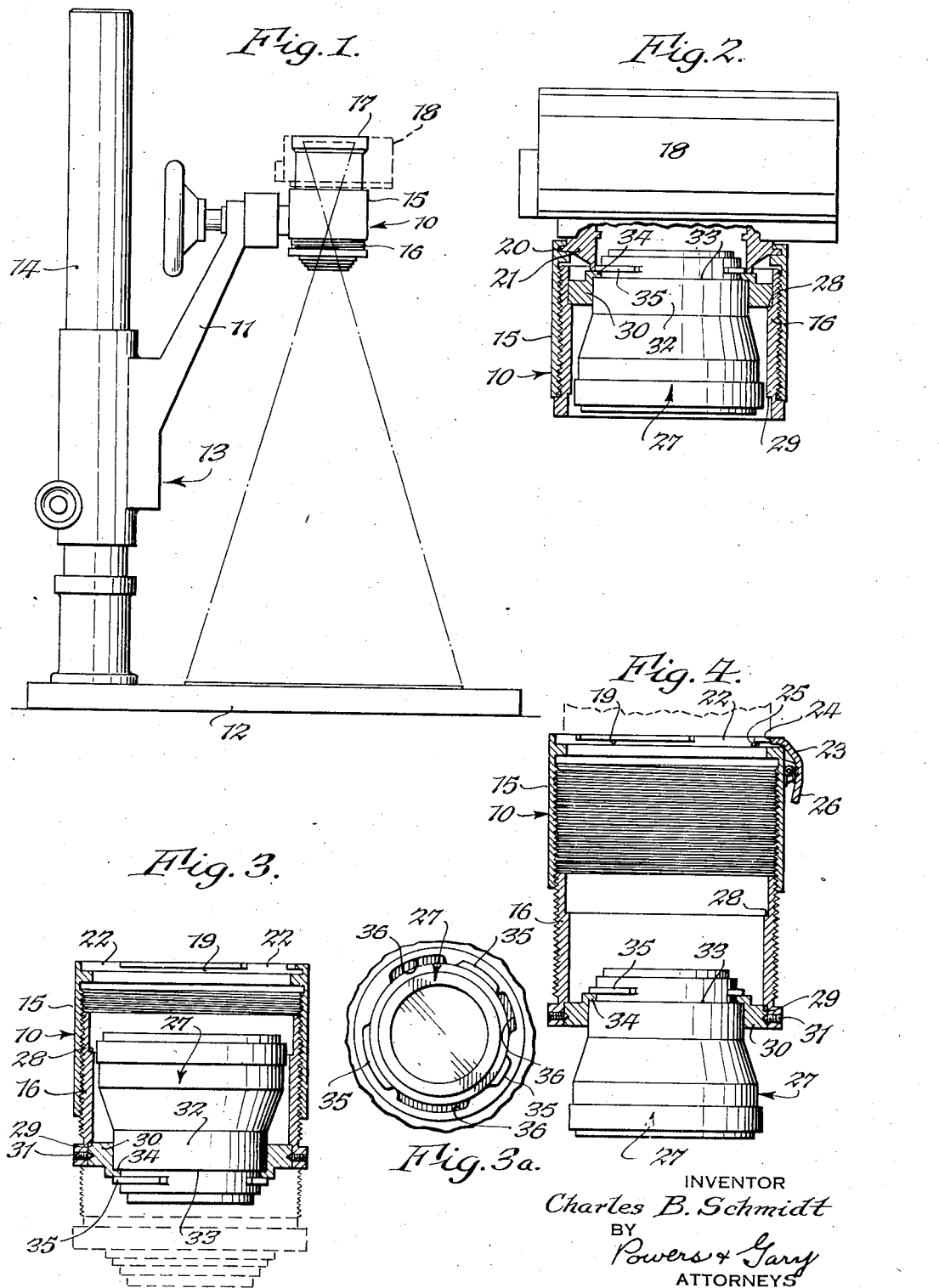
INVENTOR
Charles B. Schmidt
BY
Powers & Garry
ATTORNEYS Aug. 7, 1945.  C. B. SCHMIDT  2,381,228
FOCUSING ATTACHMENT FOR CAMERAS
Filed Nov. 18, 1942  2 Sheets-Sheet 2
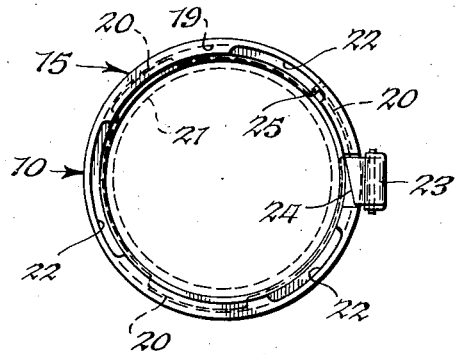
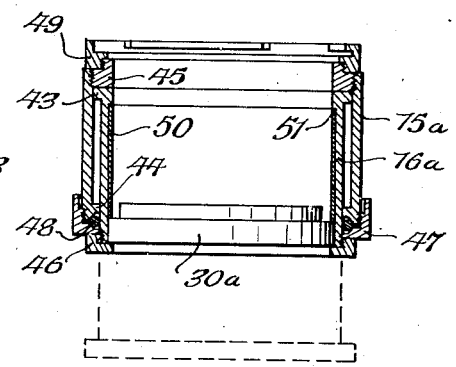
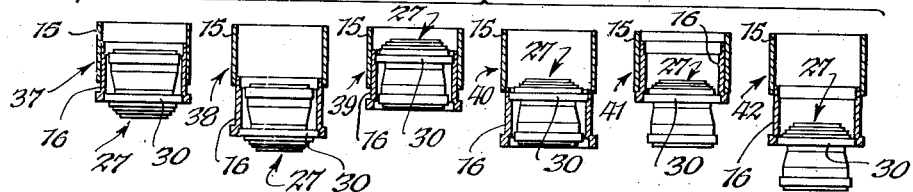
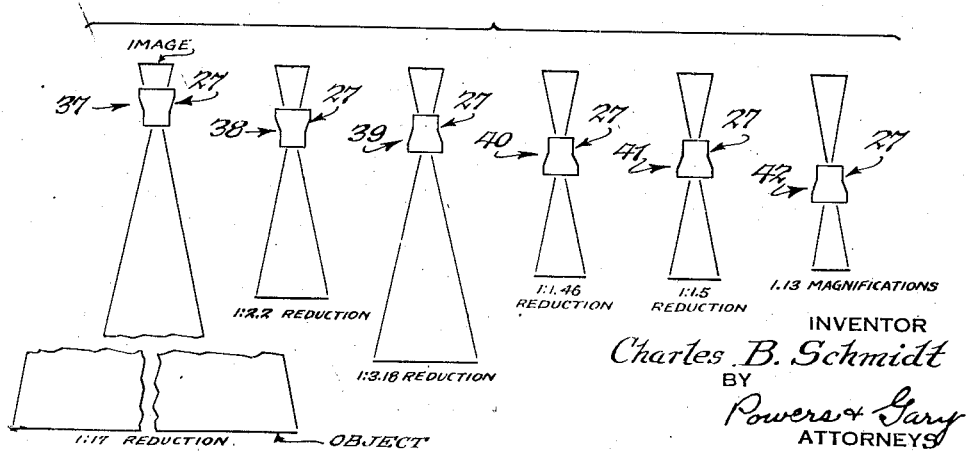
INVENTOR
Charles B. Schmidt
BY
Powers & Gary
ATTORNEYS Patented Aug. 7, 1945

2,381,228

UNITED STATES PATENT OFFICE 2,381,228

FOCUSING ATTACHMENT FOR CAMERAS

Charles B. Schmidt, Buffalo, N. Y.

Application November 18, 1942, Serial No. 465,979

3 Claims. (Cl. 95—44)

This invention relates to improvements in focusing copying attachments of the kind intended principally for use in connection with cameras of the non-collapsible lens type.

Owing to the space which they occupy, known attachments of the type generally described have the objection that their range is limited to reductions not exceeding substantially the ratio of 1:18, such attachments being "blind" insofar as reductions greater than this are concerned. A further objection to known attachments is that, as they involve the use of supplemental lenses, distortion will occur; and although this can be reduced by cutting down the diaphragm opening, it cannot be eliminated.

The principal object of the present invention is to overcome the above objections, this object contemplating a copying attachment which has no "blind" stage throughout a full range of reductions in the ratio of from 1:1 to 1:infinity and which, therefore, may be accurately focused to obtain reproductions to any desired reduced scale.

A further object is to provide an attachment which utilizes the lens of the camera with which the reproductions are to be made, thereby avoiding distortion such as ordinarily accompanies the use of supplemental lenses and enabling the lens to be employed at any diaphragm opening.

A still further object is to provide an attachment which is simple, inexpensive and compact in design and upon which conventional cameras may be readily mounted, no changes in the construction of such cameras being necessary and the use of supplemental lenses, extension tubes, distance tables and focusing scales being eliminated.

The invention is illustrated in the accompanying drawings wherein:

Figure 1 is a side elevational view of an attachment embodying the features of the invention.

Figure 2 is an enlarged view, partially in elevation and partially in section, of the attachment, the camera shown in dotted lines in Figure 1 being illustrated in full lines and the lens and mount occupying the inner seat in normal facing.

Figure 3 is a sectional view through the attachment, the lens ring occupying its outer position and the lens and mount being reversed with respect to their normal facing.

Figure 3a is a bottom view of the attachment.

Figure 4 is a sectional view similar to Figure 3, the lens ring occupying the same seat as in the latter figure but being reversed so that the lens and mount occupy normal positions.

Figure 5 is a top view of the attachment.

Figure 6 is a sectional view through a modified form of attachment.

Figure 7 is a diagrammatic view illustrating various adjustments of the attachment.

Figure 8 is a diagrammatic view illustrating the relative positions of the image, lens and object and the relative sizes of the image and object for each of such adjustments.

The attachment, indicated generally at 10 in Figure 1, is supported by an arm 11 over the baseboard 12 of a stand 13, the said arm being carried by, and being vertically adjustable on, a pillar or post 14.

As illustrated, the attachment comprises an outer internally threaded sleeve 15 and an inner externally threaded sleeve 16 which screws into and out of the former, the outer sleeve being attached to the arm 11. In order that a focusing screen 17 or a camera 18 by which reproductions are to be made may be interchangeably mounted upon the outer sleeve 15, the upper end of the latter is formed with a channel 19 for accommodating projections 20 on the aperture flange 21 (Figure 2) of the camera and similar projections on the focusing screen, cut-away portions of the upper flange of the channel (Figure 5) providing openings 22 through which such projections may pass. The focusing screen or camera, as the case may be, may, when the projections have been caused to enter the channel 19, be turned in a counter-clockwise direction to move the projections below overhanging portions of the upper flange of the channel. A spring-biased detent 23, which is mounted on the outer wall of the sleeve 15, has a beveled nose 24 which extends into the channel 19 in advance of a pin stop 25. The detent and stop are so located that as the projections 20 move under the overhanging portions of the upper flange of the channel 19, one of the projections pushes the nose of the detent aside. As this projection approaches the pin stop 25 it moves beyond the nose of the detent and the latter returns to its normal position, in which position the nose 24 is located behind the projection. The parts are thus locked against relative angular movement by the engagement of one side of one of the projections with the pin stop 25 and the other side of the projection with the detent 23. To detach the focusing screen or camera it is only necessary to depress a tailpiece 26 on the detent to move the nose of the latter out of the path of the engaged projection.

The focusing screen or camera may then be removed by turning it in a clockwise direction and withdrawing the projections 20 through the openings 22.

The inner sleeve 16 is adapted to carry the lens mount 27 and lens of the camera by which the reproductions are to be made. For this purpose the bore of the said sleeve is enlarged at its upper and lower ends to provide internal inner and outer shoulders 28 and 29. The said shoulders are in parallel planes and form alternative seats for a ring 30, the latter being adapted to rest upon the upper seat by gravity and being adapted to be secured upon the lower seat by screws 31. The bore of the ring 30 forms a socket and accommodates a body section 32 of the lens mount, said section terminating in a shoulder 33 which seats on an inwardly extending flange 34 of the ring. The reduced end of the lens mount extends through the opening defined by the flange 34 while the conventional projections 35 on said reduced end engage the opposite side of the flange to secure the lens mount to the ring. At spaced points the flange 34 is cut away to form openings 36 (Figure 3a) through which the projections 35 may be inserted and withdrawn, it being understood that, as in the manner of a bayonet joint, the lens mount may be removably attached to the ring by aligning the projections 35 with the openings 36 and inserting the reduced end of the lens mount through the opening defined by the flange, the lens mount then being turned to move the projecions behind the flange sections as illustrated.

Not only is the ring 30 adapted to be accommodated on either of the seats at the ends of the sleeve 16 but, with respect to the seat at the lower end of said sleeve, it is also adapted to be accommodated in reversed positions, as illustrated, for example, in Figures 3 and 4. The location of the lens with respect to the film in the camera may, therefore, be varied by changing the location of the ring 30 in the sleeve 16, by reversing the position of the ring and by turning the sleeve 16 to screw it into and out of the sleeve 15.

In the use of the attachment the lens mount is removed from the camera and attached to the ring 30, and the latter is placed upon the proper seat in the sleeve 16 and is secured thereto if the lower seat is employed. With the focusing screen mounted in place upon the sleeve 15, the sleeve 16 is turned until the proper focus is obtained, as will be indicated by the image upon the ground glass field of the focusing screen. The latter is then removed and the camera mounted upon the sleeve 15 in its stead and the exposure made.

In accordance with the invention the sleeves 15 and 16 are so designed with respect to the type of lens employed that the various adjustments described will enable accurate focusing for full size reproductions, certain low magnifications and any scale reductions, the adjustments for obtaining proper focusing in the production of reproductions of the sizes described being illustrated in Figure 7 of the drawings and the relative positions of the lens, image and work to be reproduced and the relative sizes of the object and image for such adjustments being shown in Figure 8.

Referring to Figures 7 and 8, it will be noted that at 37 the attachment is adjusted so that the sleeve 16 for the greater part of its length is located within the sleeve 15 while at 38 the attachment is adjusted so that the sleeve 16 is fully extended. In both adjustments the ring 30 is secured upon the seat at the lower end of the sleeve 16 and the lens mount occupies a position reversed with respect to the camera, the adjustment illustrated at 37 corresponding to a reduction of the ratio of 1:17 and that indicated at 38 corresponding to a reduction of the ratio of 1:2.2. By adjusting the sleeve 16 inwardly with respect to the position indicated at 37 the lens may be focused to any desired reduction in the ratio of from 1:17 to 1:infinity. In this connection it is to be noted that the reversal of the lens mount in the manner described enables the lens to be adjusted to, and focused in, a position corresponding to the infinity position of the lens in the camera. The attachment, therefore, has the advantage that accurate focusing of the camera within the range corresponding the large reductions is enabled.

The sleeve 16 of the attchment in the adjustments, indicated at 39 and 40, occupies substantially the same positions indicated at 37 and 38, respectively. However, in the former two views the ring 30 rests upon the seat at the upper end of the sleeve 16 and the lens mount occupies its normal position, the adjustment indicated at 39 corresponding to a reduction of the ratio of 1:3.18 while that indicated at 40 corresponds to a reduction of the ratio of 1:1.46. The sleeve 16 of the attachment, in the adjustment indicated at 41, is moved to its innermost position while in the adjustment indicated at 42 it is moved to its wholly extended position, the ring 30 in each instance occupying the lower seat in the sleeve 16 but being reversed with respect to the first two adjustments described so that the lens mount occupies its normal position. The adjustment indicated at 41 corresponds to a reduction of the ratio of 1:1.5 while the adjustment indicated at 42 corresponds to a magnification of 1.13.

It will be understood, of course, that the various adjustments illustrated in Figures 7 and 8 represent approximate limits of each of a series of adjustments and that between such limits the desired adjustments are obtained by axial movement of the sleeve 16. A comparison of the reductions obtained at the limits illustrated renders it clear that the individual stages of the entire range of adjustment overlap one another. There are, therefore, no stages, including the stage at which the lens occupies a position corresponding to infinity, at which the attachment is "blind."

It is to be further understood that the axial adjustment of the sleeve which carries the lens mount is not dependent upon a threaded connection between the said sleeve and the companion sleeve. This may be accomplished in any desired manner. For example, in the embodiment of the invention illustrated in Figure 6 the focusing attachment comprises an outer sleeve 15a and an inner sleeve 16a, the latter being slidable into and out of the former. The extended limit of the sleeve 16a is determined by an external flange 43 on its upper end which engages an internal flange 44 on the lower end of the sleeve 15a. At its retracted limit the flange 43 on the sleeve 16a abuts a threaded ring 45 which screws into the upper end of the sleeve 15a while a threaded ring 46 which screws on the lower end of the sleeve 16a abuts a threaded locking ring 47 which screws on the lower end of the sleeve 15a. The two sleeves may be locked in any desired position by tightening the locking ring to compress an annular packing element 48 between the latter and the lower end of the sleeve 15a, adjustment of the sleeve 16a into and out of the sleeve 15a being facilitated by loosening the ring 47 to reduce the pressure with which the packing element 48 is caused to frictionally engage the sleeve 16a.

In the modified construction described the ring 30a for attaching the lens mount to the inner sleeve is secured in the lower end of the said sleeve by the ring 46, while the bayonet connection for the focusing screen and camera is provided by a ring 49 which screws upon a reduced extension of the ring 45. The lower seat in this embodiment is provided by the lower end of a sleeve 50, the upper end of which abuts a shoulder 51 formed in the upper end of the sleeve 16a. The upper end of the sleeve 50 provides the upper seat for the ring 30a. When the upper seat is to be employed, assuming the ring 30a occupies the position illustrated in Figure 6, the threaded ring 46 is unscrewed from the end of the sleeve 16a. The ring 30a may then be removed as may the sleeve 50. The ring 30a is then reintroduced into the sleeve 16a, being moved to the upper end of the latter, in which position it engages the shoulder 51. The sleeve 50 is then reintroduced into the sleeve 16a, the upper end of the latter and the shoulder 51 defining a channel in which the ring 30a may be accommodated. In this position of the ring 30a, the threaded ring 46 holds the parts in place by direct engagement with the lower end of the sleeve 50.

In the illustrated embodiments, the invention is shown in connection with a Contax camera and the lens mount shown is of the type employed in such cameras. It will be appreciated, of course, that the invention may be employed to equal advantage in connection with various other types of cameras and that in the event the design of such cameras is not such as to enable their mounting upon the attachment in the manner illustrated and described, suitable adapters may be utilized to provide the desired connections.

From the foregoing it will be apparent that the attachment described has the advantage that accurate focusing of the camera is insured throughout a range which will enable any desired predetermined reduction, the use in the attachment of the lens of the camera and the elimination of supplemental lenses avoiding any possibility of distortion and enabling any desired diaphragm opening to be used. The attachment is thus simple, compact, self-contained and inexpensive in design, provides for facility in mounting the focusing screen and camera and eliminates the need for various auxiliary attachments heretofore considered necessary in copy work.

I claim as my invention:

1. A focusing attachment for use in connection with a camera which is to be employed for reduction copying, said attachment including a hollow body upon which a focusing screen and said camera may be interchangeably mounted, an axially adjustable sleeve carried by said body, a removable element carried by said sleeve and to which the lens of said camera may be attached, means for providing seats for said element at the opposite ends of said sleeve, and a removable sleeve in said first mentioned sleeve which is movable to a position in which one end holds said element on one of said seats and which is movable to a second position in which the other end holds said element on the other of said seats.

2. A unitary focusing attachment for a camera to enable its use for reduction copying, said attachment including a hollow body having at one end means for the interchangeable mounting of a focusing screen and said camera, a sleeve coaxial with said body, fitted thereto, and axially adjustable relatively thereto, and a removable element carried by said sleeve and to which the lens mounting of said camera may be detachably connected, said sleeve being formed with a seat which said element, with the lens mounting connected thereto, may occupy with the lens mounting either in a normal or a reversed position with respect to said camera, said means being formed to give open access within said hollow body to the lens mounting in its reversed position and the lens being operative in any adjusted position of said sleeve to project an object image on said focusing screen which will be of the same reduction as that which said camera will make with the sleeve so adjusted.

3. A unitary focusing attachment for a camera to enable its use for reduction copying, said attachment including a hollow body having at one end means for the interchangeable mounting of a focusing screen and said camera, a sleeve coaxial with said body, fitted thereto and axially adjustable relatively thereto, and a removable element carried by said sleeve and to which the lens mounting of said camera may be detachably connected, said sleeve having provision for inner and outer seats in parallel planes upon which said element may be selectively fitted, said element, with the lens mounting connected thereto, being selectively positionable upon the outer seat with the lens mounting in either a normal or reversed position with respect to the camera, said means being formed to give open access within said hollow body to the lens mounting in said reversed position when said element is fitted upon the outer seat, and the lens being operative in any adjusted position of said sleeve to project an object image on said focusing screen which will be of the same reduction as that which said camera will make with the sleeve so adjusted.

CHARLES B. SCHMIDT.